(12) United States Patent
Wübbolt-Gorbatenko

(10) Patent No.: US 10,451,132 B2
(45) Date of Patent: Oct. 22, 2019

(54) SWITCHABLE BEARING BUSHING FOR A MOTOR VEHICLE

(71) Applicant: Schaeffler Technologies AG & Co. KG, Herzogenaurach (DE)

(72) Inventor: Benjamin Wübbolt-Gorbatenko, Erlangen (DE)

(73) Assignee: Schaeffler Technologies AG & Co. KG, Herzogenaurzch (DE)

( * ) Notice: Subject to any disclaimer, the term of this patent is extended or adjusted under 35 U.S.C. 154(b) by 0 days.

(21) Appl. No.: 15/579,628

(22) PCT Filed: Jun. 2, 2016

(86) PCT No.: PCT/DE2016/200259
§ 371 (c)(1),
(2) Date: Dec. 5, 2017

(87) PCT Pub. No.: WO2016/198066
PCT Pub. Date: Dec. 15, 2016

(65) Prior Publication Data
US 2018/0149225 A1 May 31, 2018

(30) Foreign Application Priority Data
Jun. 12, 2015 (DE) ........................ 10 2015 210 766

(51) Int. Cl.
*F16F 1/36* (2006.01)
*B60G 17/02* (2006.01)
*B60G 7/00* (2006.01)

(52) U.S. Cl.
CPC ............ *F16F 1/3615* (2013.01); *B60G 17/02* (2013.01); *B60G 7/001* (2013.01);
(Continued)

(58) Field of Classification Search
CPC .. F16F 1/3876; F16F 1/387; F16F 1/38; F16F 1/3615; F16F 2228/066; F16F 2228/06;
(Continued)

(56) References Cited

U.S. PATENT DOCUMENTS 2,684,819 A 7/1954 Abbildungen
2,980,439 A 4/1961 Abbildungen
(Continued)

FOREIGN PATENT DOCUMENTS

| DE | 69622141 T2 | 11/2002 | |
|----|----|----|----|
| DE | 102012006174 A1 | 9/2012 | |
| DE | 102015214860 A1 * | 2/2017 | ............ F16F 1/3615 |

*Primary Examiner* — Melanie Torres Williams
(74) *Attorney, Agent, or Firm* — Antun M. Peakovic

(57) ABSTRACT

The disclosure relates to bearing bushes for a motor vehicle, in which the bearing bushing may be switchable between a first and a second stiffness stage.
The bearing bushing may include a first elastomer ring, which is arranged at least indirectly on an outer circumferential surface of a bolt, and a second elastomer ring, which is arranged radially between a first and second sleeve. The second sleeve may be arranged radially between the first and the second elastomer rings. In order to change the stiffness stage of the bearing bushing, the two sleeves may be connectable to one another by at least one ring which comes into contact with said sleeves at an end side.

14 Claims, 1 Drawing Sheet

(52) U.S. Cl.
CPC ...... *B60G 2204/10* (2013.01); *B60G 2204/41* (2013.01); *F16F 2228/066* (2013.01)

(58) Field of Classification Search
CPC .... B60G 17/02; B60G 7/001; B60G 2204/10; B60G 2204/41
See application file for complete search history.

(56) References Cited

U.S. PATENT DOCUMENTS

| | | | | |
|---|---|---|---|---|
| 8,196,911 B2* | 6/2012 | Baumbarger | ........... | F16F 1/387 267/141.2 |
| 2002/0113349 A1* | 8/2002 | Rivin | ..................... | F16F 1/387 267/140.2 |

* cited by examiner

SWITCHABLE BEARING BUSHING FOR A MOTOR VEHICLE

CROSS-REFERENCE TO RELATED APPLICATIONS

This application is the U.S. National Phase of PCT Appln. No. PCT/DE2016/200259 filed Jun. 2, 2016, which claims priority to DE 102015210766.3 filed Jun. 12, 2015, the entire disclosures of which are incorporated by reference herein.

TECHNICAL FIELD

The disclosure relates to a bearing bushing for a motor vehicle, wherein the bearing bushing is switchable between a first and a second stiffness stage.

BACKGROUND

The structure and the resulting operational data of bearing bushings that are used in a chassis of a motor vehicle may have an influence on the driving and steering characteristics of the motor vehicle. Relatively minor changes to a spring constant or stiffness of the bearing bushings can have considerable effects on the vehicle characteristics, such as for example the understeer or oversteer characteristics and chassis noises, vibrations and running harshness. Depending on the setting of the bearing bushing, the motor vehicle has a relatively "soft" or relatively "hard" running characteristic.

The generally known prior art has disclosed various bearing bushings in the chassis region of a motor vehicle. Firstly, purely mechanical bearing bushings or rubber bearings are known which have a defined stiffness. Furthermore, hydraulically damped chassis bushings with fixed or variable stiffness are known. Furthermore, bearings with magnetorheological liquids or magnetorheological elastomers are known, wherein the stiffness can be varied by means of a magnetic field.

For example, DE 696 22 141 T2 discloses a method for producing and using a suspension bushing with variable stiffness for controlling the relative movement between a suspension link in a motor vehicle and a frame component of the motor vehicle. The suspension bushing has a variable stiffness, which is realized by virtue of the fact that there is an enclosed magnetorheological elastomer or gel, the stiffness of which is variably adjustable over a wide range, specifically by means of a controllable magnetic field. The variable controllable magnetic field is generated by means of an electromagnetic structure which is completely integrated, as part of the structure, into a suspension bushing structure.

SUMMARY

One problem addressed by the disclosure includes providing a particularly inexpensive bearing bushing, which is optimized from a manufacturing aspect, for a motor vehicle, the stiffness of which bearing bushing is mechanically adjustable and is thus not based on a hydraulic or magnetorheological operating principle.

According to an embodiment of the disclosure, the bearing bushing has a first elastomer ring, which is arranged at least indirectly on an outer circumferential surface of a bolt, and a second elastomer ring, which is arranged radially between a first and second sleeve, wherein the second sleeve is arranged radially between the first and the second elastomer ring, and wherein, in order to change the stiffness stage of the bearing bushing, the two sleeves are connectable to one another by means of a respective ring which comes into contact with said sleeves at an end side. In other words, a change between a first and a second stiffness stage occurs by virtue of the fact that the respective ring comes into contact with the respective sleeve at an end side and thereby bridges the second elastomer ring arranged radially therebetween. Spacing the two rings axially apart from the respective end face results, owing to a series connection of the two elastomer rings arranged radially with respect to one another, in a relatively soft stiffness of the bearing bushing.

A third sleeve may be arranged rotationally fixedly on the outer circumferential surface of the bolt. Consequently, the first elastomer ring makes radial contact with an outer circumferential surface of the third sleeve, wherein the third sleeve is supported on the outer circumferential surface of the bolt.

The first sleeve may be arranged rotationally fixedly in a housing bore. In particular, the housing bore is formed in a chassis component of a motor vehicle.

The respective ring is advantageously axially displaceable by means of an actuator arranged thereon. Here, it is also conceivable for a single actuator to act on both rings in order to displace these axially.

The disclosure encompasses the technical teaching whereby the housing bore has a respective guide element for the axial guidance of the respective ring. The respective guide element may for example be a friction-minimizing surface within the housing bore, which permits axial guidance of the respective ring. It is however furthermore also conceivable for a groove to be formed in the housing bore, which groove prevents a rotation of the respective ring relative to the housing bore.

Furthermore, the first and second sleeves preferably each have, on the end sides, a respective structure for axially receiving the respective ring. The respective structure is advantageously formed as a bevel. An axial toothing is however likewise possible.

The respective ring preferably has, on the end sides, a respective structure which is of complementary form with respect to the respective structure on the first and second sleeves. In other words, the respective structure on the respective rings may be formed as a bevel or as an axial toothing.

In one embodiment, the two rings and the three sleeves are produced from a metallic material or a polymer material.

BRIEF DESCRIPTION OF THE DRAWINGS

Further measures which improve the disclosure will be presented in more detail below together with the description of a preferred exemplary embodiment of the disclosure on the basis of the figures. In the figures.

DETAILED DESCRIPTION

Figure 1:
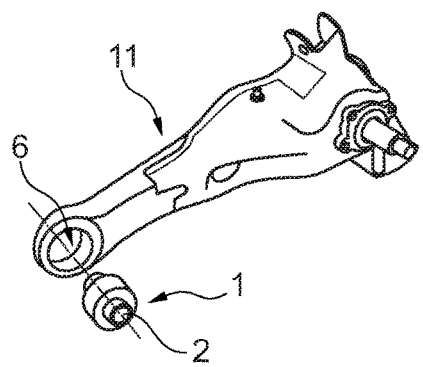
FIG. 1 is a perspective illustration of a bearing bushing according to the disclosure, which is provided for a chassis component of a motor vehicle.

As per FIG. 1, a bearing bushing 1 according to the disclosure is arranged in a housing bore 6, provided for the purpose, of a chassis component 11. The chassis component 11 is installed in a chassis (not illustrated here) of a motor vehicle (not illustrated here). A further chassis component (not illustrated here) may for example be fastened to a bolt 2 of the bearing bushing 1.

Figure 2:
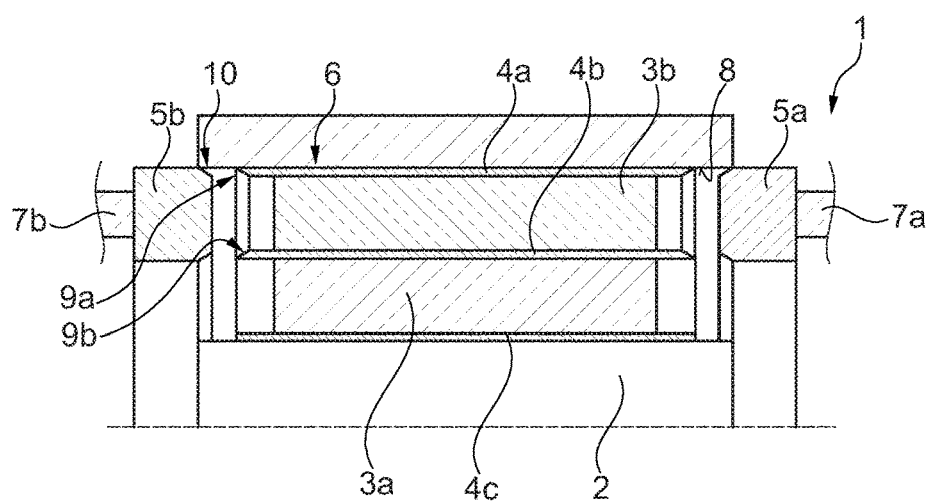
FIG. 2 shows a detail of a schematic sectional illustration for illustrating the structure of the bearing bushing according to the disclosure in the case of a first stiffness stage.
Figure 3:
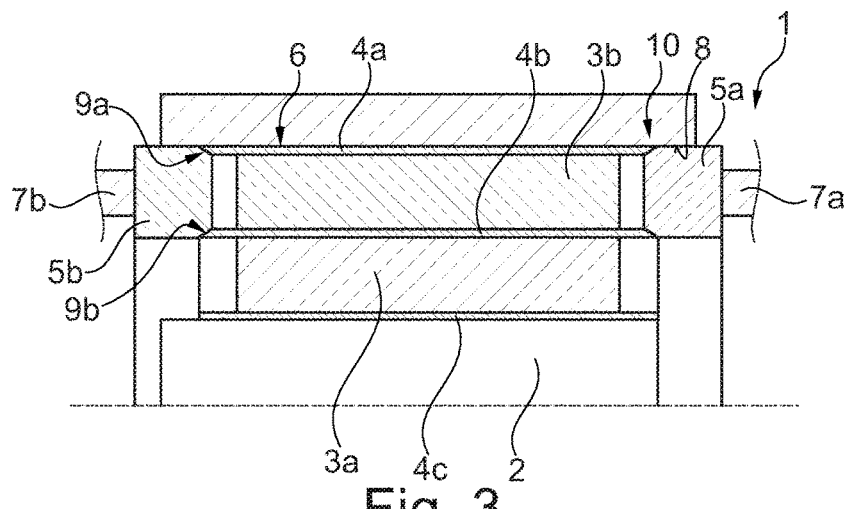
FIG. 3 shows a detail of a schematic sectional illustration for illustrating the structure of the bearing bushing according to the disclosure as per FIG. 2 in the case of a second stiffness stage.

FIGS. 2 and 3 show a partially illustrated switchable bearing bushing 1 according to the disclosure, which is switchable between a first and a second stiffness stage, wherein FIG. 2 illustrates a relatively soft stiffness stage and FIG. 3 illustrates a relatively hard stiffness stage of the switchable bearing bushing 1.

The bearing bushing 1 comprises a first and a second elastomer ring 3a, 3b and a first and a second sleeve 4a, 4b. Furthermore, the bearing bushing 1 has the bolt 2, on the outer circumferential surface of which a third sleeve 4c is rotationally fixedly arranged. The first elastomer ring 3a makes radial contact with the third sleeve 4c. The second elastomer ring 3b is arranged radially between the first and the second sleeve 4a, 4b, wherein the second sleeve 4b is arranged radially between the first and the second elastomer ring 3a, 3b and thus spatially separates the two elastomer rings 3a, 3b from one another. The first sleeve 4a is arranged rotationally fixedly in the housing bore 6.

Furthermore, the bearing bushing 1 comprises two rings 5a, 5b which are displaceable axially, by means of a respective actuator 7a, 7b arranged thereon, in order to in each case come into contact with the first and the second sleeve 4a, 4b at the end sides. The housing bore 6 has an integrated guide element 8 for the axial guidance of the respective ring 5a, 5b in the housing bore 6.

The first sleeve 4a has, on the end sides, a structure 9a which is provided for axially receiving the respective ring 5a, 5b. Furthermore, the second sleeve 4b also has, on the end sides, a structure 9b which is provided for axially receiving the respective ring 5a, 5b. The respective structure 9a, 9b on the respective ring 5a, 5b is in the form of a bevel. Furthermore, the respective ring 5a, 5b has, on the end sides, a respective structure 10 which is of complementary form with respect to the respective structure 9a, 9b on the respective first and second sleeves 4a, 4b.

In FIG. 2, the spacing between the two rings 5a, 5b is at a maximum, wherein the two elastomer rings 3a, 3b are situated in the force path and can be loaded by an external force that can be introduced via the bolt 2. The stiffness stage of the bearing bushing 1 is relatively soft owing to the two elastomer rings 3a, 3b arranged in series.

By contrast, the bearing bushing 1 as per FIG. 3 has a relatively hard stiffness stage. The spacing between the two rings 5a, 5b is at a minimum, whereby the two rings 5a, 5b come into contact with the first and the second sleeve 4a, 4b at the end sides and thereby relieve the second elastomer ring 3b of load. Consequently, the second elastomer ring 3b is bridged by the two rings 5a, 5b. Thus, only the first elastomer ring 3a would be loaded by an external force that can be introduced via the bolt 2.

LIST OF REFERENCE DESIGNATIONS

1 Bearing bushing
2 Bolt
3a, 3b Elastomer ring
4a-4c Sleeve
5a, 5b Ring
6 Housing bore
7a, 7b Actuator
8 Guide element
9a, 9b Structure
10 Structure
11 Chassis component

The invention claimed is:

1. A bearing bushing for a motor vehicle, comprising:
a first elastomer ring, which is arranged at least indirectly on an outer circumferential surface of a bolt, and a second elastomer ring, which is arranged radially between a first and second sleeve, wherein the second sleeve is arranged radially between the first and the second elastomer ring; and
the bearing bushing being switchable between a first and a second stiffness stage, wherein in order to change the stiffness stage of the bearing bushing, the two sleeves are connectable to one another by a ring which comes into contact with said sleeves at an end side;
wherein the first sleeve is arranged rotationally fixedly in a housing bore;
wherein the housing bore has a guide element for axial guidance of the ring.

2. The bearing bushing as claimed in claim 1, wherein a third sleeve is arranged rotationally fixedly on the outer circumferential surface of the bolt.

3. The bearing bushing as claimed in claim 1, wherein the ring is axially displaceable by an actuator arranged thereon.

4. The bearing bushing as claimed in claim 1, wherein the first and second sleeves each have, on the end side, a respective structure for axially receiving the ring.

5. The bearing bushing as claimed in claim 4, wherein the ring has, on the end side, a respective structure which is of complementary form with respect to the respective structure on the first and second sleeves.

6. The bearing bushing as claimed in claim 2, wherein the ring and the three sleeves are produced from a metallic material or a polymer material.

7. The bearing bushing as claimed in claim 1, wherein there are two rings, each ring configured to come into contact with said sleeves at opposing end sides.

8. The bearing bushing as claimed in claim 7, wherein the first and second sleeves each have, on each end side, a structure for axially receiving the two rings; and
the two rings have, on each end side, a respective structure which is of complementary form with respect to the structure on the first and second sleeves.

9. A bearing bushing for a motor vehicle, comprising:
a first elastomer ring, which is arranged at least indirectly on an outer circumferential surface of a bolt, and a second elastomer ring, which is arranged radially between a first and second sleeve, wherein the second sleeve is arranged radially between the first and the second elastomer ring; and
the bearing bushing being switchable between a first and a second stiffness stage, wherein in order to change the stiffness stage of the bearing bushing, the first and second sleeves are connectable to one another by a first axial ring and a second axial ring, which are configured to come into contact with said first and second sleeves at opposing end sides thereof;
wherein the first sleeve is arranged rotationally fixedly in a housing bore;
wherein the housing bore has a guide element for axial guidance of the first and second axial rings.

10. The bearing bushing as claimed in claim 9, wherein a third sleeve is arranged rotationally fixedly on the outer circumferential surface of the bolt.

11. The bearing bushing as claimed in claim 10, wherein the two axial rings and the three sleeves are produced from a metallic material or a polymer material.

12. The bearing bushing as claimed in claim 9, wherein the first and second axial rings are axially displaceable by an actuator arranged thereon.

13. The bearing bushing as claimed in claim 9, wherein the first and second sleeves each have, on the end side, a respective structure for axially receiving the first and second axial rings.

14. The bearing bushing as claimed in claim 13, wherein the first and second axial rings have, on an end side, a respective structure which is of complementary form with respect to the respective structure on the first and second sleeves.

* * * * *